(12) United States Patent
Hernacki et al.

(10) Patent No.: US 8,862,730 B1
(45) Date of Patent: Oct. 14, 2014

(54) ENABLING NAC REASSESSMENT BASED ON FINGERPRINT CHANGE

(75) Inventors: Brian Hernacki, San Carlos, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 1653 days.

(21) Appl. No.: 11/392,093

(22) Filed: Mar. 28, 2006

(51) Int. Cl.
*G06F 15/173* (2006.01)
*H04L 29/06* (2006.01)
*H04L 12/24* (2006.01)

(52) U.S. Cl.
CPC ......... *H04L 63/1433* (2013.01); *H04L 63/1408* (2013.01); *H04L 29/06884* (2013.01); *H04L 41/08* (2013.01); *H04L 29/06551* (2013.01); *H04L 63/10* (2013.01); *H04L 29/06904* (2013.01); *H04L 41/0803* (2013.01)
USPC ............. 709/225; 709/224; 713/100; 726/22; 726/23; 726/25

(58) Field of Classification Search
CPC ................... H04L 29/06551; H04L 29/06884; H04L 29/06904; H04L 12/66; H04L 41/08; H04L 41/0803; H04L 41/0869; H04L 63/10; H04L 63/1433; H04L 63/1408–63/1425
See application file for complete search history.

(56) References Cited

U.S. PATENT DOCUMENTS

| | | | |
|---|---|---|---|
| 6,301,668 B1 * | 10/2001 | Gleichauf et al. | 726/25 |
| 2005/0027837 A1 * | 2/2005 | Roese et al. | 709/223 |
| 2005/0097199 A1 * | 5/2005 | Woodard et al. | 709/223 |
| 2006/0101520 A1 * | 5/2006 | Schumaker et al. | 726/25 |

OTHER PUBLICATIONS

Sourcefire Network Security—RNA Sensor. "The 'Magic Eye' Watching Over Your Network." Sourcefire, Inc. 2006. http://www.sourcefire.com/products/ma.html.

* cited by examiner

*Primary Examiner* — Patrice Winder
*Assistant Examiner* — Nam Tran
(74) *Attorney, Agent, or Firm* — Wilmer Cutler Pickering Hale and Dorr LLP

(57) ABSTRACT

Providing security for a network is disclosed. Network traffic associated with a host is monitored. If an activity pattern associated with a configuration change of the host is observed, access by the host to the network is restricted based at least in part on the observed activity pattern.

20 Claims, 3 Drawing Sheets

ENABLING NAC REASSESSMENT BASED ON FINGERPRINT CHANGE

BACKGROUND OF THE INVENTION

Network admission control servers ("NAC servers") typically base their determination of whether to allow a client to join a network on whether the client is up-to-date with patches and security definitions. In some cases, NAC servers may also require authentication, such as by requiring a user to enter in a username and password before being granted access to a network. If the client is not up-to-date, the NAC may require the client to join a remediation network where the appropriate patches and definitions can be applied. Once the client is up-to-date, the client is admitted to the network.

Once admitted to the network, however, the client's security posture (e.g., factors upon which admission was granted) may change. Actions taken by a user, such as downloading and installing software, modifying the registry, and so on, may put a system admitted previously to the network into a state in which admission would have been denied. There are also many forms of malicious software/code, sometimes referred to as "malware," that exploit unknown vulnerabilities, system misconfigurations, third party software, and so on, which may make changes to an admitted system. In each of these cases, a client may be admitted to the enterprise network by a typical network admission control server, and remain admitted once circumstances have changed, despite the significant risk that the client potentially poses by virtue of changes on the client subsequent to its being admitted to the network.

Therefore, it would be desirable to have a better way to make and reassess network admission decisions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing security for a network is disclosed. Network traffic associated with a host is monitored. If an activity pattern associated with a configuration change of the host is observed, access by the host to the network is restricted based at least in part on the observed activity pattern.

Figure 1:
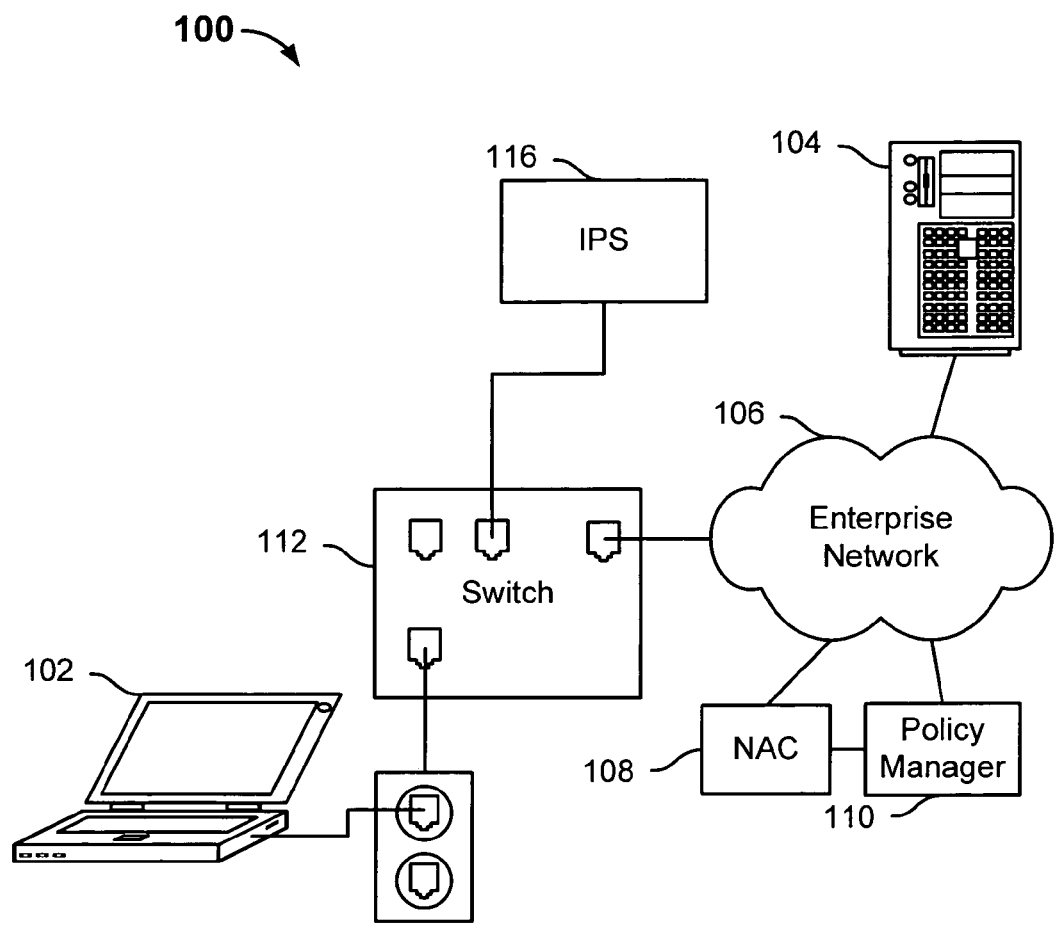
FIG. 1 is a diagram illustrating an embodiment of a system having network admission control.

FIG. 1 is a diagram illustrating an embodiment of a system having network admission control. System 100 includes at least one client 102, and other nodes, such as server 104, that are connected to a network, such as enterprise network 106. In the example shown, client 102 is an employee laptop, routinely connected and disconnected from enterprise network 106 by being plugged and unplugged from a wall plate leading to switch 112. Client 102 may also be one of a variety of other devices, such as a workstation, tablet, PDA, or other computing platform, as applicable.

When the employee attempts to connect client 102 to enterprise network 106, for example, upon return to the office at the beginning of a workday, network admission control server (hereinafter "NAC") 108 consults policy manager 110 to determine whether client 102 may access all or part of enterprise network 106, and whether any remediation is required.

When a user installs new software, upgrades the client or existing software, or makes a significant configuration change (hereinafter referred to collectively as "configuration changes"), this often affects the security posture of the client. Such configuration changes can also be the result of malware. As described in more detail below, by monitoring client 102 for indications that configuration changes (which might affect its security posture) have been made, an ongoing decision about whether client 102 should be reassessed for continued admission to the network can be made.

Monitoring may be implemented in switch 112, and/or may be implemented in optional intrusion prevention system (hereinafter "IPS") 116 as appropriate. In some embodiments, passive monitoring from the vantage point of a node such as switch 112 and/or IPS 116 enables configuration change detection without requiring that an agent be installed and properly configured on client 102 to provide information. Not requiring such an agent simplifies administration (e.g., configuring and maintaining an agent on each client) and enables the configuration change detection monitoring to be performed with respect to clients new to the network and not specially configured to connect to the network. Not using a client may also be more secure, in that if configuration change detection depended on an agent on the client, malware and/or a hacker might disable and/or interfere with operation of the agent, enabling the client to be modified without detection.

In some cases, the functionality of NAC 108 and policy manager 110 may be combined in a single device, and may perform additional tasks such as intrusion detection. In the example shown, NAC 108 has a direct connection to policy manager 110, but in other embodiments NAC 108 and policy manager 110 do not have a direct connection and instead communicate via enterprise network 106. Policy manager 110 typically holds configurable security policies for a variety of devices and circumstances, such as a mandatory minimum patch level, maximum length of time between virus scans, password characteristics, and so on. As described in more detail below, in some embodiments, policy manager 110 holds additional and/or different data to support configuration change detection, such as configuration signatures and/or fingerprints for different hosts or types of hosts that connect to enterprise network 106, and/or one or more policies that indicate a responsive action to be taken in the event a configuration change is detected with respect to a client subsequent to the client being admitted to enterprise network 106.

Typically, a system such as system 100 includes a variety of security protections not shown in FIG. 1. For example, firewalls, intrusion detection systems, and other monitors (not shown) are in place to verify that client 102 and the traffic it sends and receives do not pose a security risk. If it is determined that client 102 poses a threat and/or requires reassessment, alerts can be generated and, for example, delivered to an administrator, as appropriate.

Figure 2:
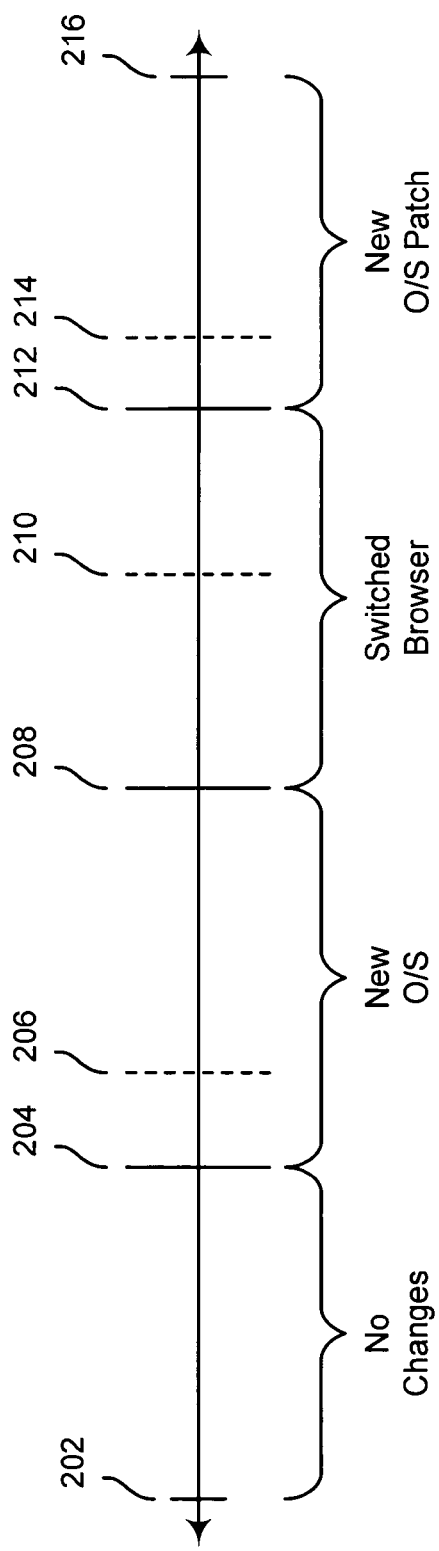
FIG. 2 is a timeline representation of a sample of a client's activity.

FIG. 2 is a timeline representation of a sample of a client's activity. At time 202, (in this case the beginning of a workday), an employee brought a laptop to work and connected it to switch 112. In the example shown, client 102 connects to a DHCP server, requesting an IP address. The DHCP server contacts NAC 108. NAC 108 performs typical configuration validation and/or authentication, such as checking the patch level of client 102 and requesting a password from the employee. The DHCP server is notified whether to assign an IP address, and if so, whether to grant full access to the enterprise, or to a limited view of the network. In other cases, client 102 may have a static IP address and/or may have its initial admission determination made at least in part through use of an agent or other components. As described in more detail below, typically, admission status is tied to a "MAC/port pair"—a physical port on switch 112 and client 102's MAC address.

After being approved by NAC 108, client 102 is admitted to the network and proceeds to conduct typical work-related network traffic from times 202 to 206. For example, during this time period, the employee opens and uses an email client and a web browser, and fetches shared files such as from server 104.

At time 204, a scan of client 102 is performed, for example, by IPS 116. As shown here, scans are performed at regular intervals (e.g., every hour) and are represented by solid lines (204, 208, 212, and 216) on the timeline shown in FIG. 2. As described in more detail below, the braces shown in FIG. 2 (e.g., between times 204 and 208) indicate the period of time between scans (e.g., between the scan at 204 and the scan at 208) and the changes, if any, detected by the subsequent scan (e.g., "new operating system detected" by scan 208).

In some embodiments, scans are scheduled irregularly or on demand, such as by being initiated by a command from an administrator, or based on the observation of a trigger in the network traffic as described in more detail below.

Both active and passive approaches (scans) may be used, either separately (and/or exclusively), or in conjunction, to detect configuration changes. Any node on network 106, such as client 102, can be actively polled, such as by a port scanner or any other network scanning technique, to determine information such as what services it offers and what operating system it is running. Passive techniques can also be employed (e.g., by IPS 116) to "fingerprint" any traffic that passes through it to/from client 102. Generally, any network traffic gives away some information about the application generating it. Whenever a vendor alters an application in a way that affects packets—their timing, their ordering, or content changes such as flags or formatting, the changes can be observed and used to identify things about the source of the traffic.

For example, in some embodiments for any node on network 106 that emits network traffic, TCP/IP fingerprinting is employed such that any time TCP packets are sent, the packets are analyzed to glean the operating system used (e.g., Windows XP), and potentially even which version of the operating system is being used (e.g. Windows XP SP2). In various embodiments, network traffic is analyzed to detect host configuration data and/or changes thereto. By observing HTTP client requests from client 102, IPS 116 can determine which browser is being used on the laptop. Plug-ins used by the browser may be similarly detected. SMB requests leak information such as which revision of an operating system client 102 is using, including, sometimes, patch level. Boot time emissions of client 102 may also provide clues about its configuration and possibly what changes might have occurred since it was last evaluated for admission. For example, if last time a host requested an IP address via DHCP, but this time appears to have booted configured statically, a policy violation (or level of suspicion) may be indicated.

Tracking and detecting when configuration changes are made, and using the resulting information to determine if a reassessment is needed, are disclosed. For example, if the employee uninstalls personal firewall software, client 102 poses a threat to network 106 and ought to be denied access to the network until the situation can be remedied. An active port scan of client 102 will readily reveal that a configuration change has been made (e.g., that client 102 is now accepting connections on a file sharing port that was previously blocked).

In some cases, information obtained through passive monitoring may be ambiguous. For example, it may be the case that a particular protocol is employed by multiple versions of an operating system (e.g., Windows 2000, XP, and Vista). In some embodiments, obtained information is correlated to help pinpoint more precisely what configuration a particular client has. Suppose that four versions of an operating system are known to insert a particular flag into a particular header (that is observed by IPS 116). IPS 116 may also observe other information (e.g., a different type of data, formed in a particular way by only two versions of an operating system) that it can compile to more precisely determine client 102's configuration—without an agent.

Configuration changes are indicated on the timeline shown in FIG. 2 as dashed lines (206, 210, and 214). At time 206, the operating system running on client 102 changed. This may be the case, for example, if client 102 is a multi-boot system and the employee rebooted the system at time 206. This may also be the case if the employee physically upgraded the operating system on client 102, for example from Windows XP™ to Windows Vista™. In the example shown, the configuration change (operating system change) is detected by switch 112 at 208 when a routine scan is performed. In some embodiments, other devices (e.g., switch 112 and IPS 116 working together) or applications may perform the detection.

A rogue employee may obtain admission to the network using one operating system (e.g., Linux), and then rely on the access granted to the MAC/port pair to run a different operating system (e.g., Windows). When a configuration change is detected, NAC 108 is notified. In some embodiments, the NAC is provided with additional information for use in the evaluation, if such information is available. For example, trend information can be sent that indicates host 102's three most recent configuration changes as observed by switch 112/IPS 116. In some embodiments, if a configuration change is detected, access is revoked until a reassessment of client 102 has been performed.

Not all configuration changes may merit a NAC reassessment, however. When client 102 was scanned at 208, the employee was using Internet Explorer 6.0.2900.2180.xpsp_sp2 to browse Web pages. At 210, the employee ceased using Internet Explorer and began using Firefox 1.5.0.1. This change in browser usage was detected the next time a scan ran, at 212. However, in this example, both browsers (having those specific version numbers) are approved for use by users of enterprise network 106. In such a case, the "configuration change" is harmless activity. Rather than serving as a basis for forcing a readmission evaluation, the information may be safely discarded, logged, or otherwise made use of.

In some embodiments, rather than configuration changes triggering network admission reevaluation, a lack of configuration change may be used. Such may be the case, for example, with a critical patch. Suppose the operating system used by client 102 (between times 206 and 214) has a serious security flaw that is discovered by an administrator during that interval. Switch 112/IPS 116 may be configured to check client 102 once an hour to determine whether or not the patch has been applied, and if not, inform NAC 108 to evaluate client 102 for network admission on a regular basis until the patch is applied.

Figure 3:
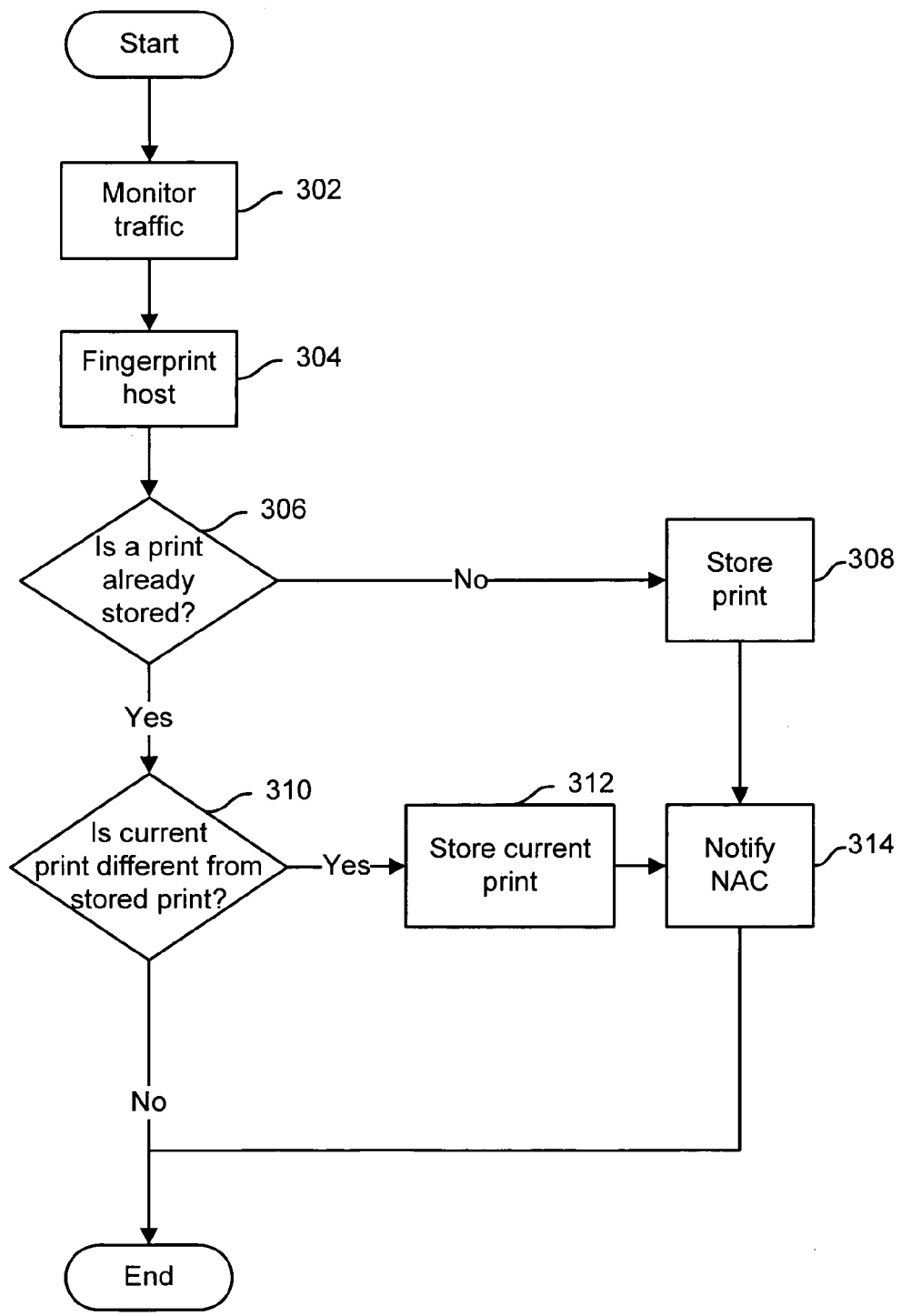
FIG. 3 is a flow chart illustrating an embodiment of a process for determining whether to reassess a client for admission to a network.

FIG. 3 is a flow chart illustrating an embodiment of a process for determining whether to reassess a client for admission to a network. In the example shown in FIG. 1, in some embodiments the process of FIG. 3 is implemented by switch 112 and IPS 116.

At 302, traffic from a host is monitored. In this example, switch 112 evaluates the traffic from client 102, looking for activity which could indicate that a configuration change has taken place. In some embodiments, the processing at 302 is performed at least in part by IPS 116. At 304, a "fingerprint" of client 102 is made. The fingerprints can take a variety of forms. For example, they may merely be a list of attributes known about client 102 (e.g., operating system version, types of services offered on which ports) stored in a text file. More complex fingerprints can also be created that take into account the information gleaned through passive monitoring. Other methods of generating/receiving signatures may also be employed, individually, or in combination with the above methods.

In some embodiments, the processing of portions 302 and 304 are combined. For example, when active scanning is used, in some embodiments switch 112 and IPS 116 only observe traffic while performing a port scan of client 102. The processing of portions 302 and 304 may thus run together, on a regular interval, such as every hour. The resulting fingerprint in some embodiments comprises a collection of open ports on client 102 as well as any banner information returned by client 102 during the scanning. If only passive scanning is used, in some embodiments switch 112 and IPS 116 monitor client 102 continuously (302), and the "fingerprint" comprises a continuously evolving aggregate of information learned from the passive scan.

At 306 it is determined whether a print of client 102 has previously been captured and stored. In the example shown, fingerprints for client 102 are stored on IPS 116 and are indexed by MAC/port pair. In some embodiments, fingerprints for all of the nodes on enterprise network 106 are stored on NAC 108 or policy server 110 and may be accessed by other features, such as a username and password that may be used during the admission process to authenticate a user to the NAC. Similarly, the evaluation of fingerprints may be performed by switch 112 and/or IPS 116, or it may be performed by IDS 108 and policy server 110 (which may store network-wide policies about such things as acceptable web browser versions for use in enterprise network 106).

If no prior fingerprint exists (is stored), the fingerprint is stored at 308 for use in future comparisons. The lack of a previous fingerprint on file may indicate that client 102 is new to the network (or has been away for a long period of time). The lack of a previous fingerprint on file may also indicate that a significant configuration change has been made or that a bad actor is attempting an attack (such as by spoofing a different MAC address). In some embodiments, if a previous fingerprint is not on file, the NAC is made aware (314) so that a network admission reevaluation can be performed by the NAC. In some embodiments, the lack of a previous fingerprint may instead trigger a log entry, an alert to an administrator, or any other appropriate response.

If a prior fingerprint is stored (306), at 310 it is determined whether the current fingerprint is different from the stored print. If so, in the example shown, the current fingerprint is stored at 312. In some embodiments, the previously stored fingerprint is removed at this time. In other embodiments, multiple fingerprints may be retained.

In some cases, such as in highly secured environments, it may be desirable to set the threshold of what constitutes a difference low (e.g., very sensitive). By setting the difference threshold low (e.g., treating even subtle variations in patch level, or browser used as significant), more false positives may be triggered, and reassessments may be forced unnecessarily. Nonetheless, by storing and comparing client fingerprints, it is possible to limit the number of scans to a manageable number of reassessments that will not cause a serious impact on the availability of the network.

As described previously in conjunction with FIG. 2, in some cases, a fingerprint change may pose little or no threat risk. Such might be the case, for example, with the employee switching from a first approved browser to second approved browser (210). In such case, rather than notifying the NAC (314), other action may be taken (e.g., logging the change, updating the fingerprint, storing two fingerprints—one indicating usage of each browser), or no action may be taken. In some embodiments, all discrepancies between fingerprints are reported to the NAC/policy server, and they make a determination of whether or not to reassess client 102 for network admission. Additional information for use by the NAC may also be provided to assist in the application of one or more policies to client 102. For example, information provided by IPS 116 may help NAC 108 determine what level of remediation to apply to client 102, or what level of access to grant to client 102 while remediation is taking place.

In the example shown, if a (sufficient) change is detected in client 102's fingerprint, NAC 108 is notified (314) so that the client can be reassessed for admission to the network. If necessary, remediation of client 102 can be performed. For example, if the virus definitions on client 102 are out of date, appropriate patches can subsequently be applied. Similarly, if the company has a rule prohibiting the installation of certain pieces of software on clients (e.g., file trading software), if it is determined that such software was installed (e.g., by the opening of ports commonly used for file trading), the appropriate remediation may be to uninstall that software before readmission to the network.

In some embodiments, at 314, the MAC/port pair permission is rescinded while reassessment is taking place—the client is denied access to the network after a fingerprint change is detected until the NAC admits the client. For example, switch 112 may refuse packets from the client until remediation has been performed with respect to the client. In some embodiments, access for a limited period of time, and/or to a limited number of services may be allowed even during the NAC reevaluation process.

In various embodiments, varying levels of access to enterprise network 106 are granted to client 102 during the reassessment period. For example, in some cases a grant of full access to the network may be given pending reassessment, and admission may only be revoked if NAC 108 determines that client 102 actually poses a threat. In other cases, limited access may be granted to client 102 while the reassessment at 408 takes place. For example, to maintain a level of continuity and/or productivity, client 102 may be allowed access to resources such as email, while preventing access to other clients on the network until the reassessment is complete. Other examples of providing limited access include providing access to the Internet only, and not to internal servers; providing access to servers but not to other clients; and other configurations, such as ones making use of one or more virtual LANs.

Depending on the risk level, only a limited set of protocols may be allowed to be used by or with client 102, or client 102 may not be allowed to connect to other clients for a period of time. The rules may also vary from node to node. For example, servers may be instructed to offer limited services to client 102, while other clients may be forbidden from communicating with client 102 at all.

The extent and/or nature of access permitted while a host is being reassessed in some embodiments is configurable, e.g., by a network security administrator.

Immediately after reassessment by NAC 108, in some embodiments, client 102 is re-fingerprinted and the resulting print is stored. This prevents an unnecessary admission reevaluation from being triggered by client 102's post-rehabilitation fingerprint varying significantly from its pre-rehabilitation fingerprint.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing security for a network, comprising:
    monitoring network traffic associated with a client computer connected to the network for an activity pattern indicating that a configuration change of the client computer may or may not have occurred, wherein the monitoring is based upon an observation of a trigger in the network traffic;
    detecting the activity pattern;
    accessing a previously stored activity pattern associated with the client computer;
    comparing the previously stored activity pattern with the detected activity pattern to determine a fingerprint difference;
    detecting a configuration change of the client computer if the fingerprint difference exceeds a difference threshold; and
    restricting access by the client computer to the network if the detected activity pattern was not previously associated with the client computer and indicates that the configuration change of the client computer may have occurred.

2. The method of claim 1 wherein the network traffic is monitored at a node other than the client computer.

3. The method of claim 1 wherein detecting the activity pattern includes active scanning.

4. The method of claim 1 wherein detecting the activity pattern includes passive scanning.

5. The method of claim 1 wherein detecting the activity pattern includes detecting one or more of an operating system, a web browser, a network protocol, and a file sharing protocol.

6. The method of claim 1 further comprising generating an alert based at least in part on the detected activity pattern.

7. The method of claim 1 further comprising storing a fingerprint associated with a configuration of the client computer.

8. The method of claim 1 further comprising restricting access by the client computer to the network if the detected activity pattern was previously associated with the client computer and indicates that the configuration change of the client computer may not have occurred.

9. The method of claim 1 wherein the configuration change of the client computer comprises at least one of: software removal from the client computer; software installation on the client computer; and software modification on the client computer.

10. A system for providing security for a network, comprising:
    a processor, configured to:
        monitor network traffic associated with a client computer connected to the network for an activity pattern indicating that a configuration change of the client computer may or may not have occurred, wherein the monitoring is based upon an observation of a trigger in the network traffic;
        detect the activity pattern;
        access a previously stored activity pattern associated with the client computer;
        compare the previously stored activity pattern with the detected activity pattern to determine a fingerprint difference;
        detect a configuration change of the client computer if the fingerprint difference exceeds a difference threshold; and
        restrict access by the client computer to the network if the detected activity pattern was not previously associated with the client computer and indicates that the configuration change of the client computer may have occurred; and
    a memory, coupled to the processor, configured to provide the processor with instructions.

11. The system of claim 10 wherein the processor is included in a network switch.

12. The system of claim 10 wherein the processor is configured to detect the activity pattern at least in part by passive scanning.

13. The system of claim 10 wherein the processor is configured to detect the activity pattern at least in part by detecting one or more of an operating system, a web browser, a network protocol, and a file sharing protocol.

14. The system of claim 10 wherein the processor is further configured to generate an alert based at least in part on the detected activity pattern.

15. The system of claim 10 wherein the processor is further configured to store a fingerprint associated with a configuration of the client computer.

16. The system of claim 10 wherein the processor is further configured to restrict access by the client computer to the network if the detected activity pattern was previously associated with the client computer and indicates that the configuration change of the client computer may not have occurred.

17. A computer program product for providing security for a network, the computer program product being embodied in a non-transitory computer readable storage medium and comprising computer instructions for:
   monitoring network traffic associated with a client computer connected to the network for an activity pattern indicating that a configuration change of the client computer may or may not have occurred, wherein the monitoring is based upon an observation of a trigger in the network traffic;
   detecting the activity pattern;
   accessing a previously stored activity pattern associated with the client computer;
   comparing the previously stored activity pattern with the detected activity pattern to determine a fingerprint difference;
   detecting a configuration change of the client computer if the fingerprint difference exceeds a difference threshold; and
   restricting access by the client computer to the network if the detected activity pattern was not previously associated with the client computer and indicates that the configuration change of the client computer may have occurred.

18. The computer program product as recited in claim 17, wherein detecting the activity pattern includes passive scanning.

19. The computer program product as recited in claim 17, the computer program product further comprising computer instructions for storing a fingerprint associated with a configuration of the client computer.

20. The computer program product as recited in claim 17, the computer program product further comprising computer instructions for restricting access by the client computer to the network if the detected activity pattern was previously associated with the client computer and indicates that the configuration change of the client computer may not have occurred.

* * * * *